United States Patent
Kang et al.

(10) Patent No.: US 9,681,429 B2
(45) Date of Patent: Jun. 13, 2017

(54) METHOD AND DEVICE FOR ALLOCATING SEARCH SPACE OF CONTROL CHANNEL IN SUBFRAME

(71) Applicant: LG ELECTRONICS INC., Seoul (KR)

(72) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 14/348,797

(22) PCT Filed: Oct. 12, 2012

(86) PCT No.: PCT/KR2012/008304
§ 371 (c)(1),
(2) Date: Mar. 31, 2014

(87) PCT Pub. No.: WO2013/055143
PCT Pub. Date: Apr. 18, 2013

(65) Prior Publication Data
US 2014/0293942 A1 Oct. 2, 2014

Related U.S. Application Data

(60) Provisional application No. 61/546,063, filed on Oct. 12, 2011.

(51) Int. Cl.
*H04W 72/04* (2009.01)
*H04L 5/00* (2006.01)

(52) U.S. Cl.
CPC ......... *H04W 72/042* (2013.01); *H04L 5/0037* (2013.01); *H04L 5/0053* (2013.01); *H04L 5/0094* (2013.01); *H04L 5/0007* (2013.01)

(58) Field of Classification Search
CPC ..................... H04W 72/042; H04L 5/0094
See application file for complete search history.

(56) References Cited

U.S. PATENT DOCUMENTS

2011/0103295 A1* 5/2011 Khandekar ........... H04W 72/04
370/315
2011/0211595 A1* 9/2011 Geirhofer ............ H04B 7/2606
370/478
(Continued)

FOREIGN PATENT DOCUMENTS

JP WO2011087042 * 7/2011
KR 10-2009-0089770 8/2009
(Continued)

OTHER PUBLICATIONS

Korean Intellectual Property Office Application Serial No. 10-2014-7004538, Notice of Allowance dated Dec. 2, 2014, 2 pages.

*Primary Examiner* — Jeffrey M Rutkowski
*Assistant Examiner* — Thomas D Busch
(74) *Attorney, Agent, or Firm* — Lee Hong Degerman Kang Waimey

(57) ABSTRACT

Disclosed are a method and a device for allocating a search space of a control channel in a subframe. A method for monitoring downlink control information comprises the steps of: acquiring first control information on a first enhanced-physical downlink control channel (e-PDCCH) by monitoring a common search space in a first slot of a subframe; and acquiring second control information on a second e-PDCCH by monitoring a user equipment (UE)-specific search space in a second slot of the subframe. Thus, (Continued)

a terminal can obtain cell-specific information through an e-PDCCH even without a legacy physical downlink control channel (PDCCH).

4 Claims, 18 Drawing Sheets

(56) References Cited

U.S. PATENT DOCUMENTS

| | | | | |
|---|---|---|---|---|
| 2012/0039283 A1* | 2/2012 | Chen | .................. | H04W 72/042 370/329 |
| 2012/0252447 A1* | 10/2012 | Sartori | .................. | H04W 48/12 455/434 |
| 2012/0320841 A1* | 12/2012 | Miki | .................... | H04B 7/0689 370/329 |
| 2014/0376422 A1* | 12/2014 | Dai | ...................... | H04L 5/0053 370/280 |

FOREIGN PATENT DOCUMENTS

| | | |
|---|---|---|
| KR | 10-2010-0124677 | 11/2010 |
| WO | 2011/049379 | 4/2011 |
| WO | 2011/085195 | 7/2011 |

* cited by examiner

METHOD AND DEVICE FOR ALLOCATING SEARCH SPACE OF CONTROL CHANNEL IN SUBFRAME

CROSS-REFERENCE TO RELATED APPLICATIONS

This application is the National Stage filing under 35 U.S.C. 371 of International Application No. PCT/KR2012/008304, filed on Oct. 12, 2012, which claims the benefit of U.S. Provisional Application Ser. No. 61/546,063, filed on Oct. 12, 2011, the contents of which are all hereby incorporated by reference herein in their entirety.

TECHNICAL FIELD

The present invention relates to wireless communication, and more specifically to a method and apparatus of assigning a search space for blind decoding a control channel in a subframe.

BACKGROUND ART

More and more data is recently transmitted over a wireless communication network due to appearance of various devices, such as smartphones or tablet PCs, which require machine-to-machine (M2M) communication and transmission of a large amount of data. More interest is oriented toward carrier aggregation and cognitive radio technologies that enable effective use of a broader frequency bandwidth to satisfy transmission of a large amount of data and multi-antenna technologies and multi-base station cooperative technologies that may raise data capacity in a limited frequency range.

Further, wireless communication networks have been evolving in such a manner that the density of nodes to which a user may gain access increases. Here, the "nodes" occasionally mean antennas or antenna groups which are spaced apart at a predetermined distance in a distributed antenna system (DAS), but are not limited to such concept, and may be expanded in meaning. That is, a node may be a pico-cell base station (PeNB), a home base station (HeNB), an RRH (remote radio head), an RRU (remote radio unit), or a relay. When having higher density of nodes, the wireless communication system may show higher system performance thanks to inter-node cooperation.

In other words, rather than when operating as an independent base station (Base Station (BS), Advanced BS (ABS), Node-B (NB), eNode-B (eNB), Access Point (AP), etc.) without cooperation from another node, when the transmission/reception is managed by a control station to thereby operate as an antenna or antenna group in a cell, each node may exhibit much higher system performance. Hereinafter, a wireless communication system including a plurality of nodes is referred to as multi-node system.

Not only when defined as an antenna group having a predetermined interval, but also when defined as an antenna group that has nothing to do with the interval, the nodes may apply. For example, it can be seen that a base station including cross polarized antennas is constituted of a node having an H-pol antenna and a node having a V-pol antenna.

In the multi-node system, different nodes from each other for each terminal may transmit a signal to the terminal, and a plurality of nodes may be set. At this time, different reference signals for each node may be transmitted. In such case, the terminal may measure a channel state between each node and the terminal based on the plurality of reference signals and may periodically or aperiodically feed back channel state information.

SUMMARY OF INVENTION

Technical Problem

An object of the present invention is to provide a method of assigning a search space of a control channel to a subframe.

Another object of the present invention is to provide an apparatus that performs a method of assigning a search space of a control channel to a subframe.

Technical Solution

To achieve the above object, according to an aspect of the present invention, a method of monitoring downlink control information may comprise monitoring a common search space at a first slot of a subframe to obtain first control information over a first enhanced physical downlink control channel (e-PDCCH) and monitoring a user equipment (UE)-specific search space at a second slot of the subframe to obtain second control information over a second e-PDCCH, wherein the first control information is cell-specific control information and is demodulated by a first demodulation (DM)-reference signal (RS) transmitted in a common search space where the first e-PDCCH is transmitted and wherein the second control information is UE-specific control information and is demodulated by the second DM-RS transmitted in the UE-specific search space where the second e-PDCCH is transmitted. The first DM-RS may be transmitted using an open loop transmission method, and the second DM-RS may be transmitted using a closed loop transmission method. The method of monitoring downlink control information may further comprise transmitting information on a resource block assigned to the common search space and information on a resource block assigned to the UE-specific search space through radio resource control (RRC) signaling or a channel state information (CSI)-reference signal (RS) configuration information element. The method of monitoring downlink control information may further comprise transmitting information on whether a resource block assigned to the common search space is included in a region where cross-interleaving is performed and information on whether a resource block assigned to the UE-specific search space is included in a region where cross-interleaving is performed through radio resource control (RRC) signaling or a channel state information (CSI)-reference signal (RS) configuration information element. An allocation pattern of a resource block of the first e-PDCCH in the common search space may be the same as an allocation pattern of a resource block of the second e-PDCCH in the UE-specific search space. The method of monitoring downlink control information may further comprise monitoring the UE-specific search space at the first slot of the subframe to obtain the second control information over the second e-PDCCH.

To achieve the above object, according to an aspect of the present invention, a wireless device to monitor downlink control channel may be configured to monitor a common search space at a first slot of a subframe to obtain first control information over a first enhanced physical downlink control channel (e-PDCCH) and monitor a user equipment (UE)-specific search space at a second slot of the subframe to obtain second control information over a second e-PDCCH, wherein the first control information is cell-specific control information and is demodulated by a first demodulation (DM)-reference signal (RS) transmitted in a common search space where the first e-PDCCH is transmitted and wherein the second control information is UE-specific control information and is demodulated by the second DM-RS transmitted in the UE-specific search space where the second e-PDCCH is transmitted. The first DM-RS may be transmitted using an open loop transmission method, and the second DM-RS may be transmitted using a closed loop transmission method. The processor may be further configured to transmit information on a resource block assigned to the common search space and information on a resource block assigned to the UE-specific search space through radio resource control (RRC) signaling or a channel state information (CSI)-reference signal (RS) configuration information element. The processor may be further configured to transmit information on whether a resource block assigned to the common search space is included in a region where cross-interleaving is performed and information on whether a resource block assigned to the UE-specific search space is included in a region where cross-interleaving is performed through radio resource control (RRC) signaling or a channel state information (CSI)-reference signal (RS) configuration information element. An allocation pattern of a resource block of the first e-PDCCH in the common search space may be the same as an allocation pattern of a resource block of the second e-PDCCH in the UE-specific search space. The processor may be further configured to monitor the UE-specific search space at the first slot of the subframe to obtain the second control information over the second e-PDCCH.

Advantageous Effects

As described above, the method and apparatus of assigning a search space of a control channel in a subframe according to an embodiment of the present invention enables a terminal to obtain cell-specific information through e-PDCCH even without legacy PDCCH (physical downlink control channel) by assigning both a common search space and a UE-specific search space to the search space of e-PDCCH (enhanced physical downlink control channel).

MODE FOR INVENTION

The following technologies may be used in various multiple access schemes, such as CDMA (code division multiple access), FDMA (frequency division multiple access), TDMA (time division multiple access), OFDMA (orthogonal frequency division multiple access), or SC-FDMA (single carrier-frequency division multiple access).

CDMA may be implemented as a radio technology, such as UTRA (Universal Terrestrial Radio Access) or CDMA2000. TDMA may be implemented as a radio technology, such as GSM (Global System for Mobile communications)/GPRS (General Packet Radio Service)/EDGE (Enhanced Data Rates for GSM Evolution). OFDMA may be implemented as a radio technology, such as IEEE (Institute of Electrical and Electronics Engineers) 802.11 (Wi-Fi), IEEE 802.16 (WiMAX), IEEE 802.20, or E-UTRA (Evolved UTRA). UTRA is part of UMTS (Universal Mobile Telecommunications System). 3GPP (3rd Generation Partnership Project) LTE (Long Term Evolution) is part of E-UMTS (Evolved UMTS) using E-UTRA, and adopts OFDMA for downlink and SC-FDMA for uplink. LTE-A (Advanced) is an evolution of LTE.

Figure 1:
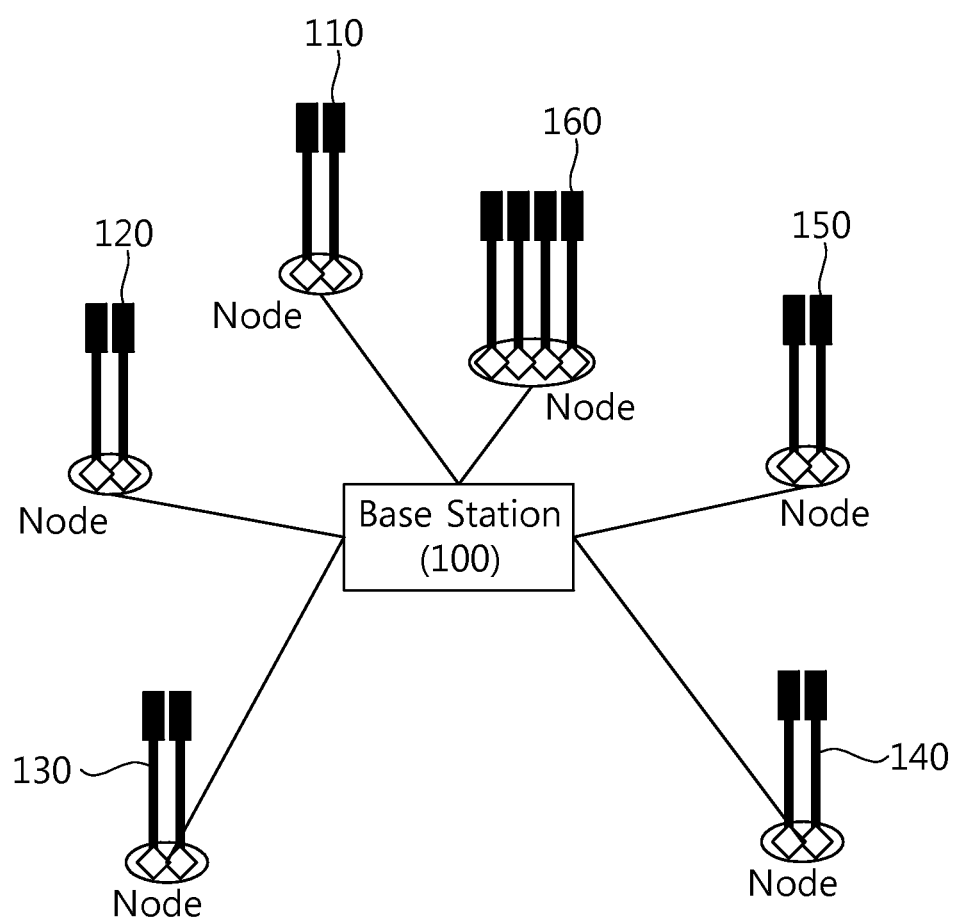
FIG. 1 is a conceptual view illustrating a single cell multi-distributed node system.

FIG. 1 is a conceptual view illustrating a single cell multi-distributed node system.

Referring to FIG. 1, in the single cell multi-distributed node system, the transmission/reception of each node 110, 120, 130, 140, 150, and 160 is managed by a single base station controller 100 and so may operate as part of one cell.

Hereinafter, in an embodiment of the present invention, a node generally refers to an antenna group (which may physically correspond to RRH (Remote Radio Head) or RRU (Remote Radio Unit)) spaced apart by a predetermined interval or more from a DAS (Distributed Antenna System). However, as used herein, the node may be construed as some antenna group irrespective of a physical interval. For example, according to an embodiment of the present invention, a base station consisting of cross polarized antennas may be referred to as being constituted of a node including an H-pol antenna and a node including a V-pol antenna. A node may be not an antenna group, but a base station, such as a pico cell base station (PeNB) or a home base station (HeNB).

Further, as used herein, the 'node' is not restricted to a node in the physical point of view and may be expanded as a node in the logical point of view. The 'node in the logical point of view' means a transmission pilot signal that is recognized as a node by a terminal. For example, an LTE terminal may recognize configuration information of a node through CRS (Cell-specific Reference Signal) or CSI-RS (Channel State Information Reference Signal) port(s). Accordingly, a node logically recognized by a terminal may be different from an actual physical node. For example, in a cell where N CRS ports are transmitted, an LTE terminal may recognize that this cell is constituted of one node having N transmission antennas. However, this cell may have various physical node configurations. For example, in the cell, two nodes each may transmit N/2 CRS ports. As another example, a number of nodes having N transmission antennas may transmit CRS ports in an SFN (Single Frequency Network) style.

At last, the relationship between a physical node and a logical node may be transparent in light of a terminal, and the terminal may thus recognize the node in the logical point of view and may perform transmission/reception processing. In an LTE-A system, a logical node may be recognized as one CSI-RS resource (or pattern). For example, if a number of CSI-RS resources are set for a terminal, the terminal may recognize each CSI-RS resource as one logical node and may perform transmission/reception processing.

Hereinafter, an antenna according to an embodiment of the present invention may be also referred to as an antenna port, a virtual antenna, or antenna group, as well as a physical antenna.

The control channel currently used in 3GPP LTE/LTE-A system has many limitations in applying to such multi-distributed node system. To address such limitations, in the following embodiments of the present invention, a method of transmitting a new control channel which may apply to the multi-node system—e-PDCCH (enhanced physical downlink control channel)—is disclosed.

Figure 2:
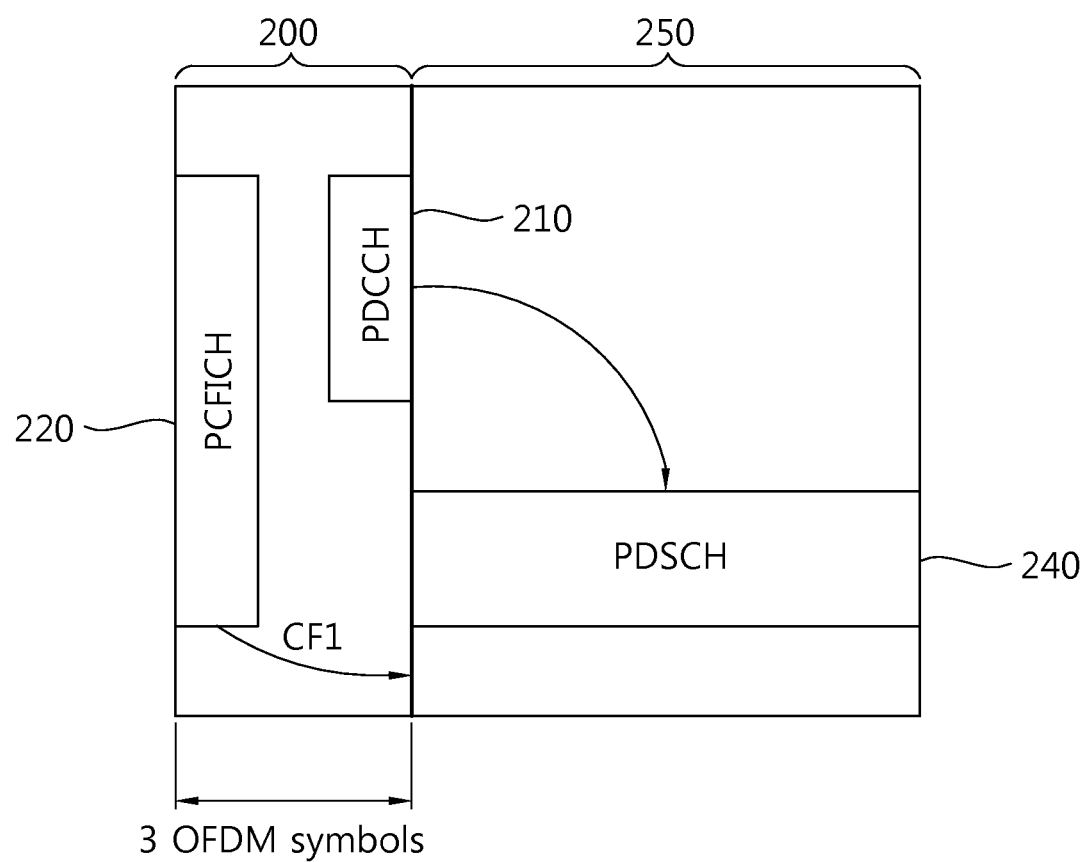
FIG. 2 is a conceptual view illustrating an existing downlink L1/L2 control signaling scheme.

FIG. 2 is a conceptual view illustrating an existing downlink L1/L2 control signaling scheme.

To support transmission of downlink and uplink transmission channels, downlink control signaling is needed. Such downlink control signaling is referred to as downlink L1/L2 control signaling because part of the downlink control information is generated from the physical layer (L1, layer 1) and part of the downlink control information is generated from MAC (L2, layer 2).

For example, downlink L1/L2 control signaling may consist of 1) downlink scheduling assignment including information necessary of a terminal to properly receive, demodulate, and decode DL-SCH (downlink shared channel), 2) uplink scheduling grant that indicates a transmission format and a resource used for a terminal to perform uplink transmission (UL-SCH, uplink shared channel), and 3) HARQ (hybrid automatic repeat-request) acknowledgement for UL-SCH transmission. Besides, the downlink L1/L2 control signaling may be used to transmit a power control command for performing power control on uplink physical channels.

Referring to FIG. 2, the downlink L1/L2 control signaling is transmitted at an early part of each subframe. Accordingly, each subframe may be divided into a control region 200 for downlink L1/L2 control signaling and a data region 250 for data transmission. The control region of the existing 3GPP LTE/LTE-A system always occupies a region corresponding to a predetermined integer number of OFDM symbols, such as 1, 2, or 3 OFDM symbols.

In the existing 3GPP LTE/LTE-A system, a PDCCH (physical downlink control channel, 210) is used to control the terminal. A region mapped with PDCCHs 210 in the subframe to control the terminal is defined as a control region (or PDCCH region). In general, the control region where the PDCCH 210 is transmitted corresponds to an earliest OFDM symbol section of the downlink subframe, and is typically set within a range of three OFDM symbols or less ("≤3 OFDM symbols"). The control region where the PDCCH 210 is transmitted (the region corresponding to an earliest OFDM symbol section of the downlink subframe) can have variable region.

The region where the PDCCH 210 is transmitted is set as a cell-specific value due to a limitation that it needs to be searched by all the terminals, and information on the region where the PDCCH 210 is transmitted may be transmitted through a CFI (control format indicator). The control format indicator is transmitted through a PCFICH (physical control format indicator channel, 220), and this includes OFDM symbol section information for the control region.

The number of OFDM symbols occupied by the control region may be dynamically changed on a per-subframe basis. Accordingly, the amount of wireless resource used for control signaling may flexibly change as well to comply with the traffic circumstance. In case many users are not scheduled in one subframe, the amount of control signaling required is also small, so that the number of OFDM symbols occupied by the control region may be reduced while a majority of the subframe may be assigned for data transmission.

The downlink control signaling includes three types of physical channels as follows:

(1) PCFICH (physical control format indicator channel, 220)

PCFICH 220 may send information on the size of the control region (1, 2, or 3 OFDM symbols) to the terminal (2) PDCCH (physical downlink control channel, 210)

This channel is used for transmitting downlink scheduling grant and uplink scheduling assignment. Each PDCCH may signal control information on a single terminal (or a group of terminals)

Hereinafter, in the embodiment of the present invention, downlink scheduling grant or DL grant may be used equally in meaning to the downlink scheduling assignment. Also, uplink scheduling assignment, UL grant, or UL assignment may be used equally in meaning to uplink scheduling grant.

(3) PHICH (physical HARQ indicator channel, not shown)

This channel may be used to transmit HARQ acknowledgement for uplink UL-SCH transmission Turning back to FIG. 2, the above-described downlink control signaling channel is described. The PCIFCH 220 may indicate the size of the control region by the number of OFDM symbols. Further, when the data region begins in the subframe may be indirectly indicated as well. In case the PCIFCH 220 is erroneously demodulated, the terminal cannot be aware of the position of the control channels in the subframe. Nor does not the terminal know when the data region starts in the subframe. Accordingly, the terminal needs to exactly demodulate the PCIFCH 220. For example, if the CFI (control format indicator) transmitted through the PCIFCH 220 is 3, the terminal may gain information stating that the control region where the PDCCH is to be detected is 3 OFDM symbol section.

The terminal may receive DCI (downlink control information), such as scheduling determination and power control commands, from the PDCCH detected in the OFDM symbol section assigned in the control region.

The DCI (downlink control information) may include 1) downlink scheduling assignment information including PDSCH resource designation, transmission format, HARQ information, and spatial multiplexing-related control information, wherein the downlink scheduling assignment information may also include a command for performing power control on the uplink physical channel, such as PUCCH (physical uplink control channel), 2) an uplink scheduling grant including PUSCH resource designation, transmission format, and HARQ information, wherein the uplink scheduling grant may also include a command for performing power control on the uplink physical channel, such as PUSCH, and a separate DCI may include, 3) a power control command transmitted to the aggregation of terminals so as to back up a power control command included in the downlink scheduling assignment/uplink scheduling grant.

The above-described different types of control information may generally have different DCI message sizes. For example, a case where resource blocks are discontinuously assigned in the frequency domain and support spatial multiplexing requires a larger scheduling message than an uplink scheduling grant in which resource blocks are continuously arranged in light of frequency. Accordingly, DCI may be classified into different DCI formats and the DCI formats may be divided depending on the specific message size and purposes.

PDSCH (physical downlink shared channel, 240) is a channel that is controlled by PDCCH 210. Terminal-specific data may be unicast through the PDSCH.

There are limitations in controlling the multi-node system having multiple access nodes in the cell node only with the control region and control channel shown in FIG. 2. Accordingly, to address such problems, a new control channel needs to be introduced. Here, the multi-node system may, in its meaning, include a DAS (distributed antenna system), RRH (radio remote head), or multi-node system.

Figure 3:
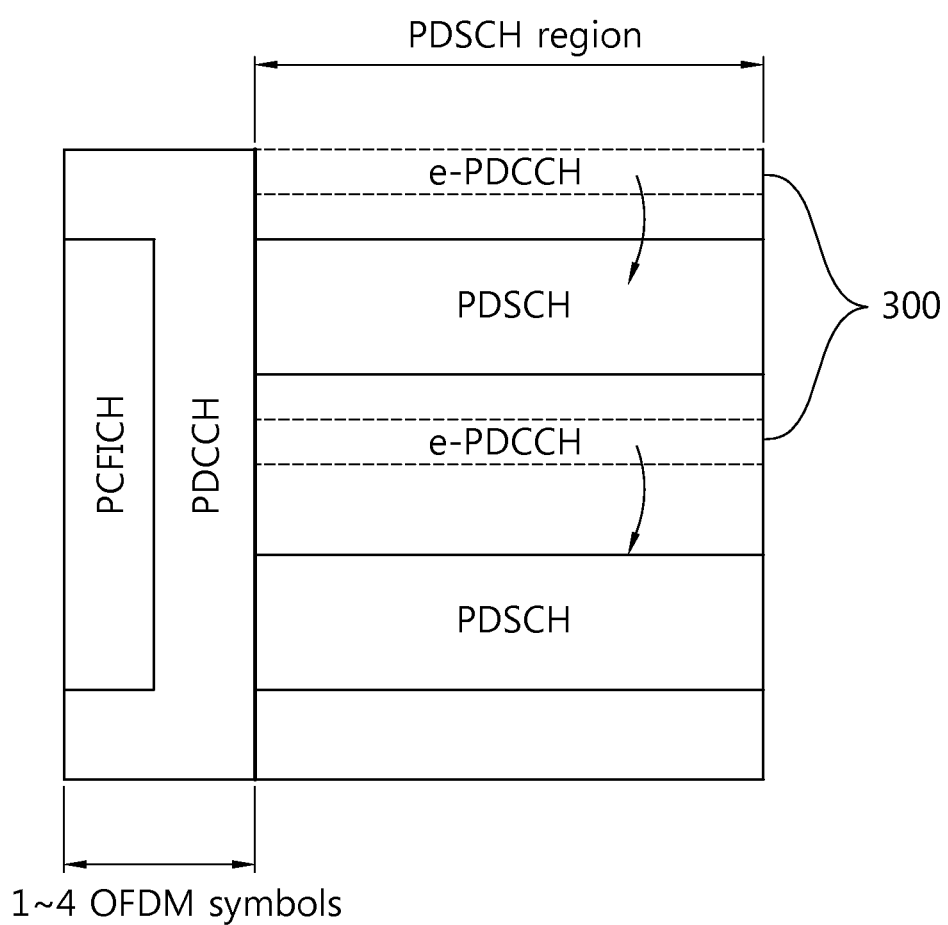
FIG. 3 is a conceptual view illustrating a newly introduced control channel, e-PDCCH (enhanced physical downlink control channel).

FIG. 3 is a conceptual view illustrating a newly introduced control channel, e-n PDCCH (enhanced physical downlink control channel).

As multi-distributed node systems, such as RRHs (radio remote heads), are introduced, various communication schemes, such as per-terminal/base station cooperation or cooperative methods, may be applicable, so that link quality may be enhanced. Current control channels have limitations in applying various communication schemes, such as MIMO (multiple-input multiple-output) scheme and cooperative communication scheme (for example, CoMP (coordinated Multi-Point transmission/reception), to a multi-distributed node environment having a plurality of nodes.

Accordingly, introduction to a new control channel is demanded which may be applicable to the multi-distributed node environment. A new control channel defined in response to such demand is e-PDCCH (RRH-PDCCH and x-PDCCH are collectively referred to as e-PDCCH). As a position where e-PDCCH 300 is assigned in the subframe, rather than the existing control region (hereinafter, referred to as PDCCH region), a data transmission region (hereinafter, PDSCH (physical downlink shared channel)) may be used.

The control information for the node of the multi-distributed node system may be transmitted per terminal through e-PDCCH 300, thereby addressing problems that may arise due to lack of the control region. The terminal needs to perform blind decoding procedure to detect whether e-PDCCH 300 is present. Although e-PDCCH 300 performs the same scheduling operation (PDSCH, PUSCH control) as the existing PDCCH, as the number of terminals that gain access to a node (for example, RRH (remote radio head)) increases, more e-PDCCHs 300 are assigned in the PDSCH region, which increases the count of blind decoding that is supposed to be done by the terminal, thereby increasing complexity.

A specific method of assigning the e-PDCCH 300 may be defined based on the R-PDCCH structure which is a control region newly defined for the existing transmission using a relay.

Figure 4:
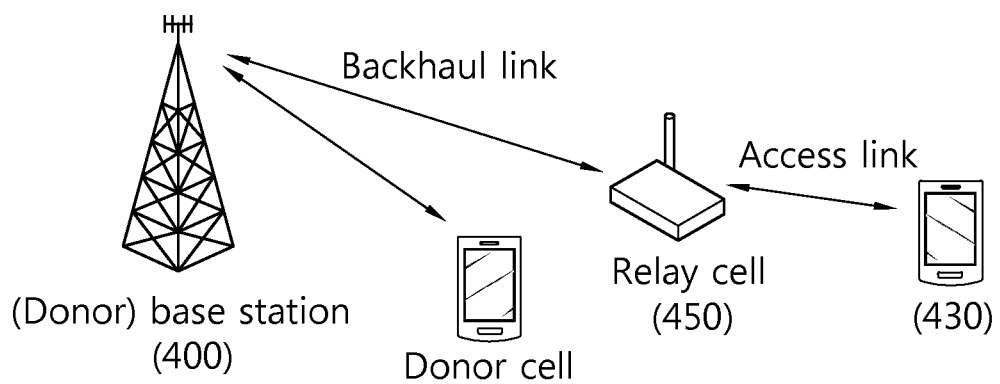
FIG. 4 is a conceptual view illustrating a relay scheme suggested in LTE.

FIG. 4 is a conceptual view illustrating a relay scheme suggested in LTE.

Referring to FIG. 4, for the decode-and-forward relaying scheme using a relay 450, R-PDCCH (relay physical downlink control channel) may be newly defined and used.

In the relay 450, a backhaul link between the relay 450 and the base station 400 and an access link between the relay 450 and the terminal 430 may be generated in the same frequency spectrum. In case the backhaul link and the access link are generated in the same frequency spectrum, when the relay 450 is receiving data from the base station 400 through the backhaul link, the operation that the relay 450 transmits data to the terminal 430 through the access link is hard to occur at the same time. Accordingly, for transmission or reception not to be simultaneously done at the backhaul link and the access link, a method needs which separates the operations of the two links from each other.

When a frame is transmitted from the relay 450 to the terminal 430 through the access link to separate the backhaul link and the access link from each other in operation, a transmission gap is created between a subframe and another subframe, so that a frame may be transmitted from the base station 400 to the relay 450 through the backhaul link in the transmission gap.

In case of a frame transmitted from the base station 400 to the relay 450 through the transmission gap, since the transmission duration is shorter than the full subframe duration, L1/L2 control signal may not be transmitted from the base station 400 to the relay 450 using the general PDCCH. For such a reason, an R-PDCCH is newly defined and used, which is a relay-specific control channel, in the existing control channel.

Figure 5:
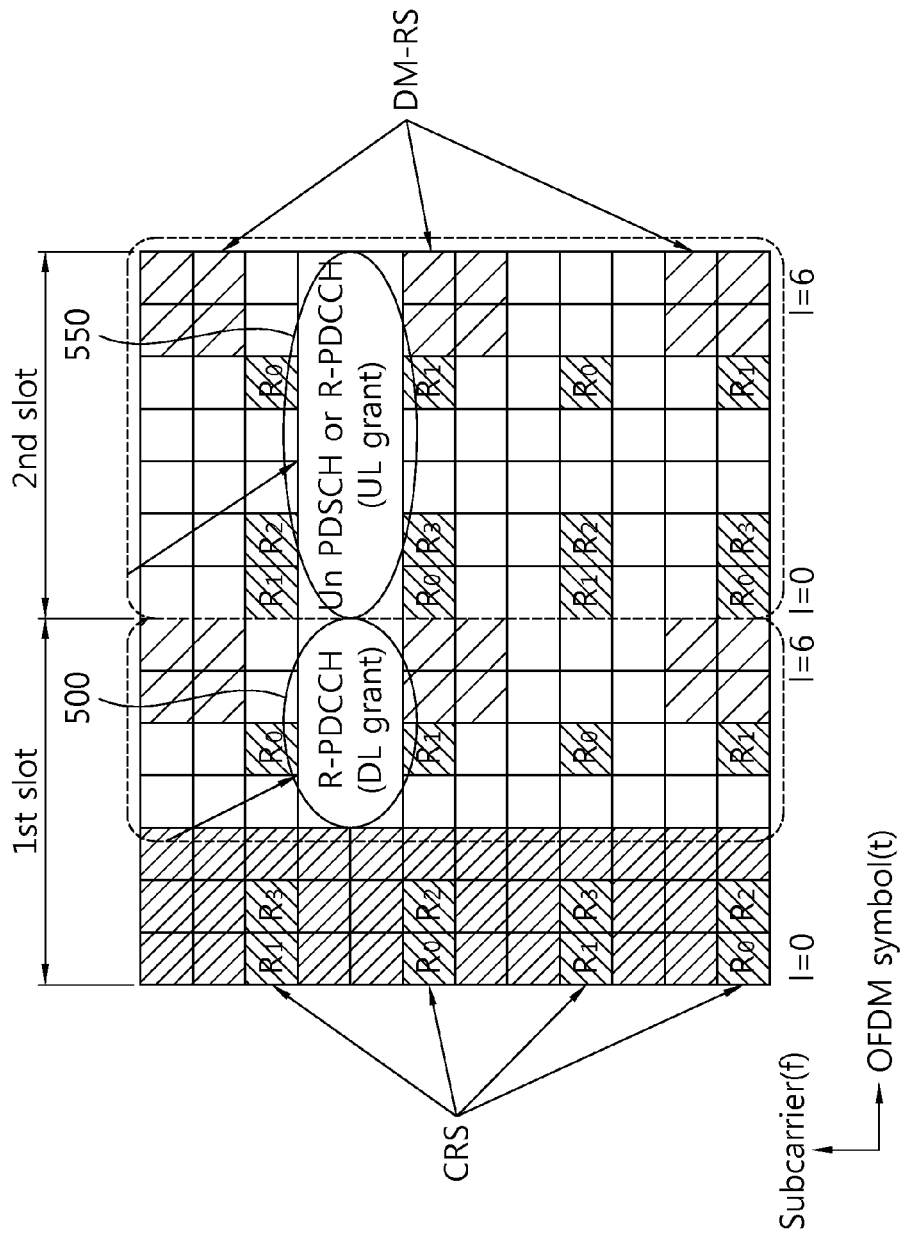
FIG. 5 is a conceptual view illustrating a structure of allocation of an R-PDCCH for a relay.

FIG. 5 is a conceptual view illustrating a structure of allocation of an R-PDCCH for a relay.

Referring to FIG. 5, R-PDCCH uses the same format as a DCI format used for PDCCH, and may transmit downlink scheduling assignment 500 and uplink scheduling grants 550. In general, as a method of splitting a frame into a control region and a data region, in light of latency, the control regions needs to be positioned at the foremost portion of the subframe as possible.

For the same reason, the downlink scheduling assignment 500 of the R-PDCCH may be first assigned to the first slot of the subframe. The uplink scheduling grant 550, which is relatively less critical in light of latency, may be assigned to the second slot of the subframe. Further, the R-PDCCH is configured so that a resource element used for R-PDCCH is spanned in a small range over the frequency axis and in a large range over the time axis in terms of overhead and scheduling flexibility.

When using such structure of R-PDCCH, the terminal may first decode the time-critical downlink scheduling assignment 500. If there is no uplink scheduling grant 550, the resource element where the uplink scheduling grant 550 may be used for transmitting the PDSCH.

The regions other than R-PDCCH, CRS (cell-specific reference signal), DMRS (demodulation reference signal) may be used to transmit PDSCH (physical downlink shared channel). The method of transmitting the PDSCH may be determined depending on a reference signal through which the transmission mode, DCI format, and R-PDCCH are demodulated.

The following Table 1 shows a method of transmitting PDSCH according to transmission mode, DCI format, and R-PDCCH.

TABLE 1

| Transmission mode | DCI format | Transmission scheme of PDSCH corresponding to R-PDCCH |
|---|---|---|
| Mode 8 | DCI format 1A | If the R-PDCCH is demodulated based on UE-specific reference signals: Single antenna port; port 7 and $n_{SCID}$ = 0 is used. If the R-PDCCH is demodulated based on cell-specific reference signals: If the number of PBCH antenna ports is one: Single-antenna port, port 0 is used Otherwise Transmit diversity is used |
|  | DCI format 2B | Dual layer transmission, port 7 and 8; or single-antenna port, port 7 or 8 |
| Mode 9 | DCI format 1A | If the R-PDCCH is demodulated based on UE-specific reference signals: Single antenna port; port 7 and $n_{SCID}$ = 0 is used. If the R-PDCCH is demodulated based on cell-specific reference signals: If the number of PBCH antenna ports is one: Single-antenna port, port 0 is used Otherwise Transmit diversity is used |
|  | DCI format 2C | Up to 4 layer transmission, ports 7-10 |

Referring to Table 1, the method of transmitting PDSCH may be determined depending on whether DM-RS or CRS is used for demodulation of transmission mode, DCI format, and R-PDCCH.

The transmission mode concerns which multi-antenna transmission scheme is to be used, and the transmission method according to each transmission mode may be as follows:

Transmission mode 1: Single-antenna transmission.
Transmission mode 2: Transmit diversity.
Transmission mode 3: Open-loop codebook-based precoding in the case of more than one layer, transmit diversity in the case of rank-one transmission.
Transmission mode 4: Closed-loop codebook-based precoding.
Transmission mode 5: Multi-user-MIMO version of transmission mode 4.
Transmission mode 6: Special case of closed-loop codebook-based precoding limited to single-layer transmission.
Transmission mode 7: Release-8 non-codebook-based precoding supporting only single-layer transmission.
Transmission mode 8: Release-9 non-codebook-based precoding supporting up to two layers.
Transmission mode 9: Release-10 non-codebook-based precoding supporting up to eight layers.

As a transmission mode to transmit R-PDCCH, transmission mode 8 and transmission mode 9 may be used.

DCI (downlink control information) may have a plurality of formats, and among the plurality of DCI formats, the DCI format used for transmission of PDSCH may have DCI format 1A and DCI format 2B in case of transmission mode 8, and may have DCI format 1A and DCI format 2C in case of transmission mode 9. The details on various DCI formats are specified in 3GPP TS 36.213 V10.3.0 "3rd Generation Partnership Project Technical Specification Group Radio Access Network; Evolved Universal Terrestrial Radio Access (E-UTRA); Physical layer procedures (Release 10)".

For example, in case transmission mode 8, DCI format is 1A, and the reference signal used for demodulating R-PDCCH is UE-specific reference signal (DM-RS), a single antenna (port 7) is used and 0 is used as scrambling ID (SCID) to transmit the PDSCH. In contrast, in case the reference signal used for demodulation of R-PDCCH is CRS, only when the number of PBCHs (physical broadcast channel) transmission antennas is 1, port 0 is used, and when the number of PBCH transmission antennas is 2 or 4, a shift to Tx diversity mode is made to use all of ports 0 to 1 and ports 0 to 3.

The newly defined control channel, e-PDCCH, may be transformed based on the R-PDCCH assigning method.

e-PDCCH may be a channel that transmits control information demodulated by DM (demodulation)-RS (reference signal) transmitted in the resource region where e-PDCCH is transmitted.

Figure 6:
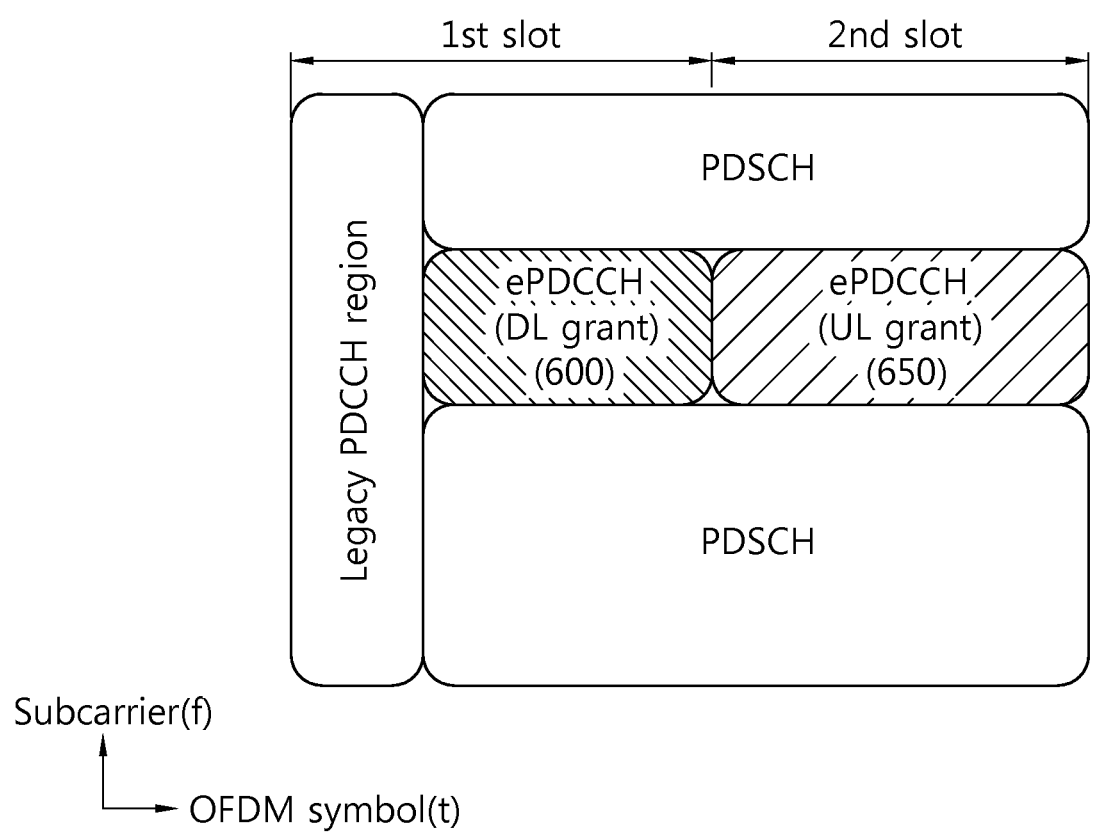
FIG. 6 is a conceptual view illustrating a method of transmitting control information through e-PDCCH in a subframe.

FIG. 6 is a conceptual view illustrating a method of transmitting control information through e-PDCCH in a subframe.

In FIG. 6, assuming that e-PDCCH is configured in the first slot and the second slot in the subframe, when assigning the e-PDCCH in the subframe, DL grant (600, downlink scheduling assignment) is assigned to the first slot of the subframe, and UL grant (650, uplink scheduling grant) is assigned to the second slot. Here, the DL grant 600 may include DCI formats (e.g.: DCI formats 1, 1A, 1B, 1C, 1D, 2, 2A, etc.) that transmit downlink control information of the terminal and the UL grant may include information corresponding to DCI formats (e.g.: DCI formats 0 and 4) which are uplink control information of the terminal.

Since the DL grant 600 and the UL grant 650 are transmitted with the DI grant 600 and the UL grant 650 separated from each other per slot in the subframe, the terminal may perform blind decoding to find the DL grant based on search space in the first slot of the subframe and may perform blind decoding to find the UL grant based on search space in the second slot of the subframe, thereby demodulating the DL grant and the UL grant.

The terminal detects the format of e-PDCCH through blind decoding while being with no information on the format of e-PDCCH. e_PDCCH may be transmitted through the aggregation of resource elements, such as CCEs (control channel elements), wherein CCEs may configure aggregation according to an aggregation level. Search space means a space for searching for CCE according to the aggregation level, which is supposed to be searched by the terminal so as to detect the format of e-PDCCH. That is, the terminal may explore the DL grant 50 and UL grant 550 by performing blind decoding in the search space.

The count of blind decoding for finding the DL grant 500 may be obtained by multiplying the number of candidates of R-PDCCH by the number of DCI formats according to the DL TM (downlink transmission mode). The count of blind decoding for finding the UL grant 550 may be obtained by multiplying the number of candidates of R-PDCCH by the number of DCI formats according to the UL TM (uplink transmission mode).

(1) Number of Candidates of R-PDCCH

R-PDCCH may be mapped with the subframe based on CCE (control channel element). One CCE may mean the aggregation of 36 resource elements. To transmit a specific R-PDCCH, 1, 2, 4, or 8 CCEs may be grouped to form aggregation. The number of CCEs included in the CCE aggregation may be referred to as aggregation level. The number of CCEs used to transmit the R-PDCCH may change depending on various factors, such as channel state or size of control information.

Since information on the aggregation level of the CCE used to transmit the R-PDCCH and the position of the CCE are not signaled, the terminal should obtain such information through blind decoding. To reduce the count of blind decoding upon performing the blind decoding, a search space is defined, which may be the aggregation of candidate control channels constituted of CCEs which the terminal should attempt to decode over the given aggregation level. If there is a limitation to the search space according to the aggregation level, blind decoding on the R-PDCCH may be done in the corresponding search space according to the aggregation level.

For example, to decode the R-PDCCH, the search space may be defined so that when the aggregation level of CCE is 1, the blind decoding is performed six times and when the aggregation level is 2, the blind decoding is performed six times, when the aggregation level is 4, the blind decoding is performed two times, and when the aggregation level is 8, the blind decoding is performed two times.

That is, the number of candidates of R-PDCCH may be 16 (6+6+2+2), which is the total count of search done in the search space according to each CCE aggregation level.

(2) Number of DCI Formats

As a downlink transmission mode available in the 3GPP LTE system, one of modes 1 to 0 may be used, and as an uplink transmission mode, one of modes 1 and 2 may be used. Information on which transmission mode is to be used as the downlink transmission mode and uplink transmission mode may be transmitted through an upper layer.

In case one downlink transmission mode is determined at the upper layer, there may be two DCI formats that may be used according to each transmission mode, and which one of the two DCI formats has been used needs to be determined by the terminal through blind decoding. That is, the terminal should perform blind decoding on which one of the two DCI formats has been used according to the downlink transmission mode with respect to the DL grant 500.

In case one uplink transmission mode is determined at the upper layer, when the uplink transmission mode is 1, the DCI format used by the terminal is DCI format 0, and when the uplink transmission mode is 2, the DCI format used by the terminal may be one of DCI format 0 or 4.

In other words, in case the uplink transmission mode is 1 with respect to the UL grant 550, the DCI format is 0, so that no blind decoding needs to be done, but in case the uplink transmission mode is 2, blind decoding needs to be done to determine whether the DCI format is 0 or 4.

In the case shown in FIG. 5, the count of blind decoding that should be done by the terminal on each of the DL grant 500 and UL grant 500 assignment regions to search for e-PDCCH is as follows:

(1) Count of blind decoding that needs to be done on DL grant 500

Number of R-PDCCH candidates (16)×number of DCI formats according to DL TM (2)=32

(2) Count of blind decoding that needs to be done on UL grant

Number of R-PDCCH candidates (16)×number of DCI formats according to UL TM 0 (1)=16

Number of R-PDCCH candidates (16)×number of DCI formats according to UL TM 1 (2)=32

The total count of blind decoding performed by the terminal at the first and second slots may be 48 (32+16) in case UL TM is 0, and 64 (32+32) in case UL TM is 1.

Figure 7:
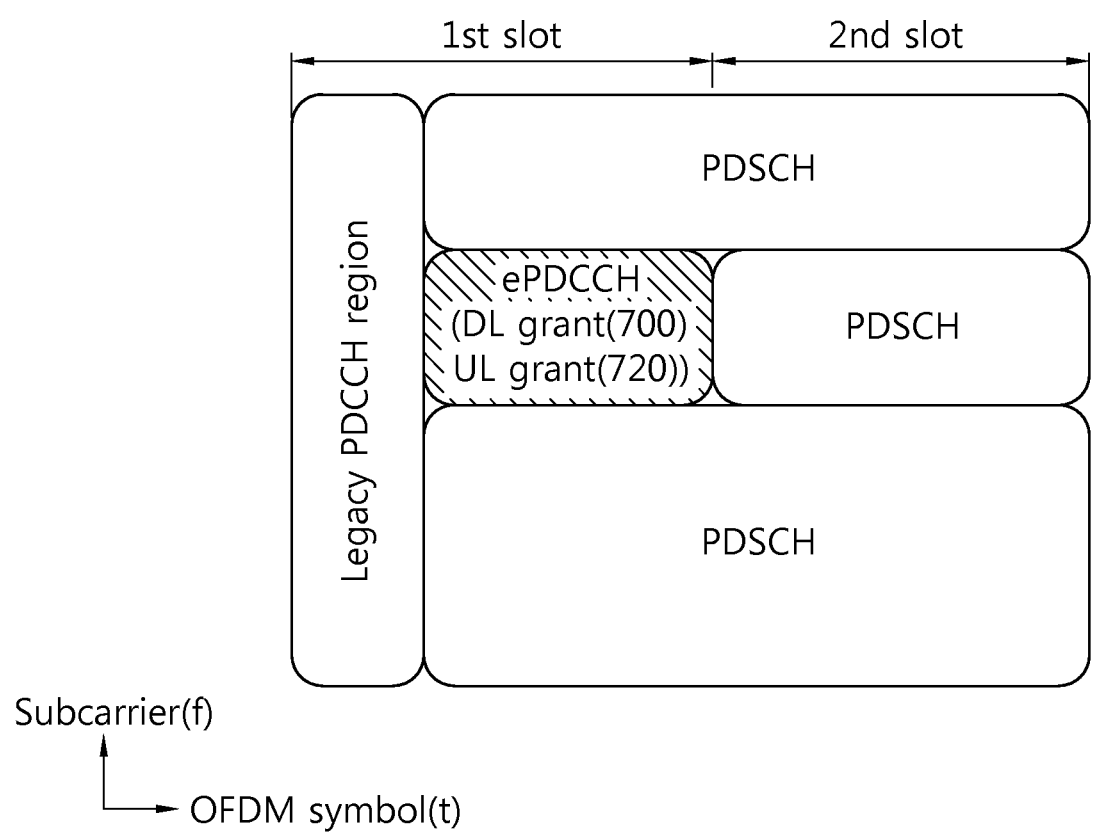
FIG. 7 is a conceptual view illustrating a method of simultaneously assigning DL grant and UL grant to a first slot to transmit control information through e-PDCCH.

FIG. 7 is a conceptual view illustrating a method of simultaneously assigning DL grant and UL grant to a first slot to transmit control information through e-PDCCH.

Referring to FIG. 7, assuming that when assigning e-PDCCH, e-PDCCH is configured only in the first slot of the subframe, the DL grant 700 and the UL grant 720 may be assigned to the first slot of the subframe at the same time. Accordingly, the DL grant 700 and the UL grant 720 are simultaneously present in the e-PDCCH of the first slot, and the terminal may perform blind decoding to find the DL grant 700 and the UL grant 720 only at the first slot of the subframe.

Like what has been described above, in the 3GPP LTE system, a DCI format is determined which needs to be searched depending on a TM (transmission mode) set per terminal. In particular, a total of two DCI formats, i.e., DL grant 700, are determined per TM, and each DL TM basically includes DCI format 1A to support the fall-back mode. In the UL grant 720, DCI format 0 has the same length as DCI format 1A and may be discerned through 1 bit flag, so that no additional blind decoding is done. However, in the UL grant 720, the remaining DCI format, DCI format 4, needs to be subjected to additional blind decoding.

In case shown in FIG. 7, the count of blind decoding performed for the terminal to explore the DL grant 700 and the UL grant 720 in the search space to search e-PDCCH is as follows:

(1) Count of blind decoding that needs to be done on DL grant 700

Number of R-PDCCH candidates (16)×number of DCI formats according to DL TM (2)=32

(2) Count of blind decoding that needs to be done on UL grant 720 in case UL TM is 0, no blind decoding is done on DCI format 0 of UL grant 720, and accordingly, the count is 0 in case UL TM is 2, number of R-PDCCH candidates (16)×number of DCI formats according to UL TM 0 (1)=16

That is, the total count of blind decoding performed at the first and second slots is 32 (32+0) in case UL TM is 0 and 48 (32+16) in case UL TM is 1.

The search space may be divided into a common search space and a UE-specific search space or terminal specific search space depending on information transmitted.

Unlike the UE specific search space or terminal specific search space, the common search space is a space for simultaneously transmitting control information to all the terminals or a predetermined group of terminals and may be present in the channel for transmitting cell-specific information, such as legacy PDCCH.

For example, the common search space of PDCCH may be used to transmit dynamic scheduling information or paging message for system information on all the terminals or a predetermined group of terminals in the cell. That is, LTE may define a common search space for transmitting cell-specific control information together with a UE specific search space or terminal specific search space for transmitting terminal specific control information, so that control information for a specific terminal may be transmitted separately from control information for a plurality of terminals.

In the above-described e-PDCCH transmission methods, UE-specific control information alone is transmitted through e-PDCCH while cell specific information is not transmitted. That is, e-PDCCH has only the UE-specific search space and the common search space is present only in the existing PDCCH (legacy PDCCH), so that the cell-specific control information is transmitted through the legacy PDCCH.

In case such control channel structure is provided, if only the UE-specific control information is transmitted through e-PDCCH, the terminal finds cell-specific information from the PDCCH, which is a preexistent control channel, and then finds the UE-specific information from e-PDCCH, thereby receiving control information. When using such control channel transmission method, the terminal has a burden that it should find both the legacy PDCCH region and e-PDCCH region. Further, such control channel transmission method may be invalid for a carrier that does not have the cell-specific RS nor the legacy PDCCH, which is currently considered in LTE.

Hereinafter, according to an embodiment of the present invention, there is described a method to address such problems, which transmits both control information through the common search space and control information through the UE-specific search space using e-PDCCH.

Figure 8:
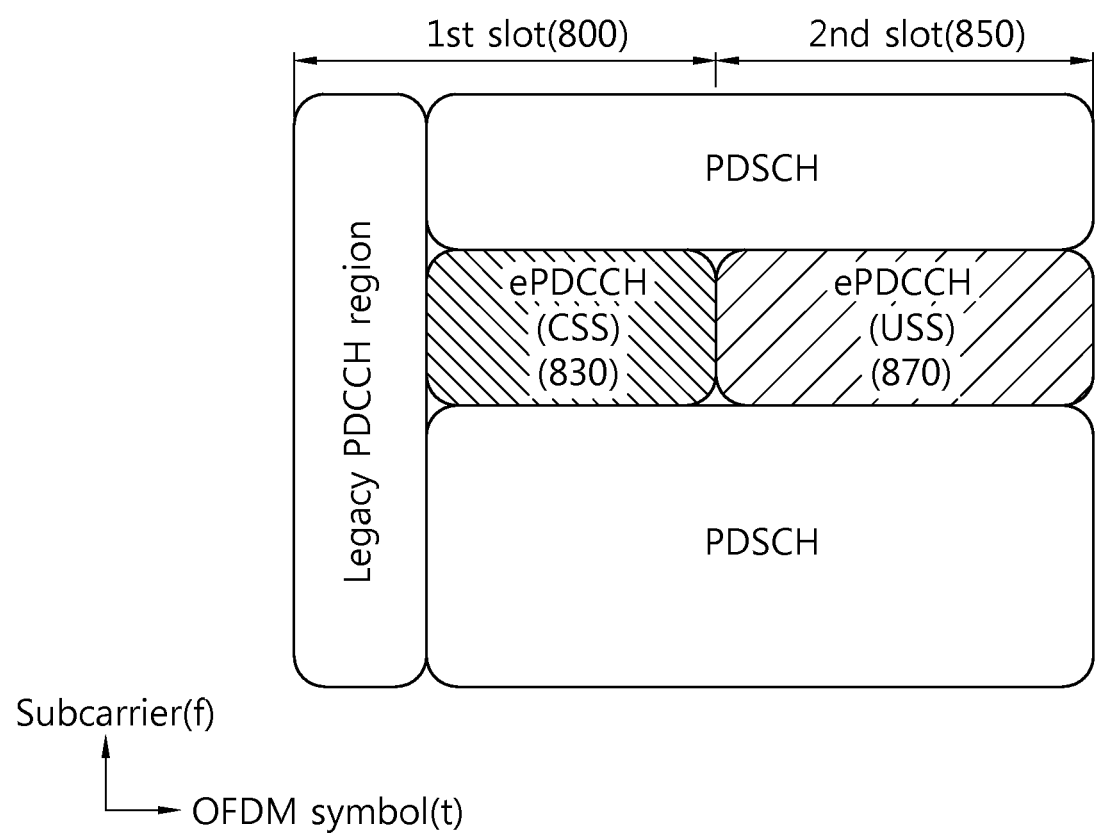
FIG. 8 is a conceptual view illustrating a method of transmitting control information through e-PDCCH according to an embodiment of the present invention.

FIG. 8 is a conceptual view illustrating a method of transmitting control information through e-PDCCH according to an embodiment of the present invention.

Referring to FIG. 8, when transmitting control information through e-PDCCH, control information through the common search space 830 may be transmitted through a first slot 800 of the subframe, and control information through the UE-specific search space 870 may be transmitted through a second slot 850.

By using such e-PDCCH transmission method, the terminal may obtain the terminal common control information or cell-specific control information (for example, system information) through the common search space 830 of e-PDCCH even without searching for the legacy PDCCH.

Hereinafter, according to an embodiment of the present invention, information transmitted through the common search space 830 is referred to as terminal common control information or cell-specific control information (for example, system information) and information transmitted through the UE-specific search space 870 is referred to as terminal specific control information. However, such control information is an example to represent control information transmitted through the common search space 830 and the UE-specific search space 870, and other types of control information may be transmitted through the common search space 830 and the UE-specific search space 870, and such embodiment is also within the scope of the present invention.

By assigning the common search space 830 to the first slot 800 of the subframe, the terminal may first decode the common search space 830. The terminal may further reduce decoding latency by quickly obtaining system information through the common search space 830. Further, in case the UE specific search space 870 is present in the second slot 850 alone, the count of blind decoding of the terminal may be relatively reduced in comparison with when the UE specific search space 870 is present in the first slot 800 and the second slot 850.

The position of the region wherein the common search space 830 is present and size information (resource allocation information) are transmitted from the base station to the terminal as RRC (radio resource control) information. For signaling, some of resource allocation types 0/1/2 may be used which are defined in 3GPP TS 36.213 V10.1.0: "Evolved Universal Terrestrial Radio Access (E-UTRA); Physical layer procedures (Release 10)".

Figure 9:
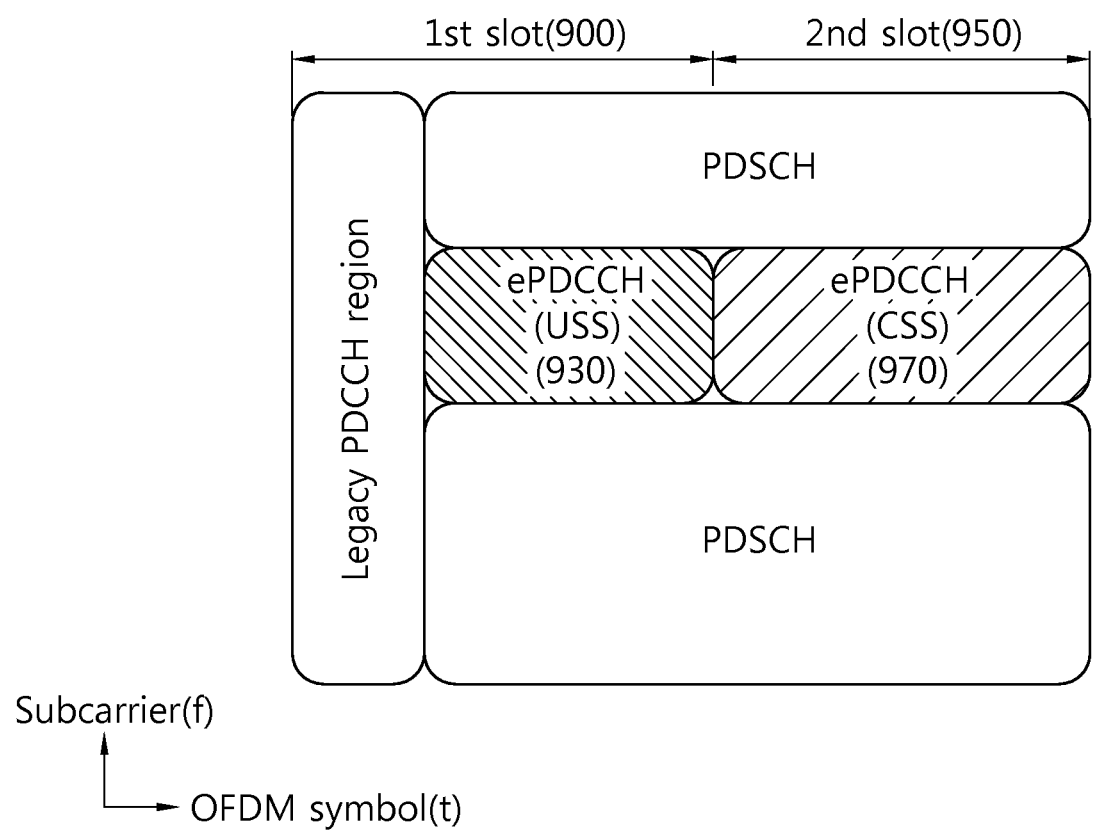
FIG. 9 is a conceptual view illustrating a method of transmitting control information through e-PDCCH according to an embodiment of the present invention.

FIG. 9 is a conceptual view illustrating a method of transmitting control information through e-PDCCH according to an embodiment of the present invention.

FIG. 9 is directed toward another embodiment for transmitting control information through e-PDCCH, and unlike FIG. 8, the UE specific search space 930 of e-PDCCH may be assigned to the first slot 900. The terminal may obtain control information through the UE specific search space 930 by performing blind decoding on the first slot.

The control information through the common search space 970 may be transmitted through the second slot 950, and the terminal may obtain system information by performing blind decoding on the second slot 950.

Even when using such e-PDCCH transmission method, the terminal may obtain system information based on the control information transmitted through the common search space, and thus, does not need to explor the legacy PDCCH region to find the system information while obtaining the control information even without the legacy PDCCH.

Figure 10:
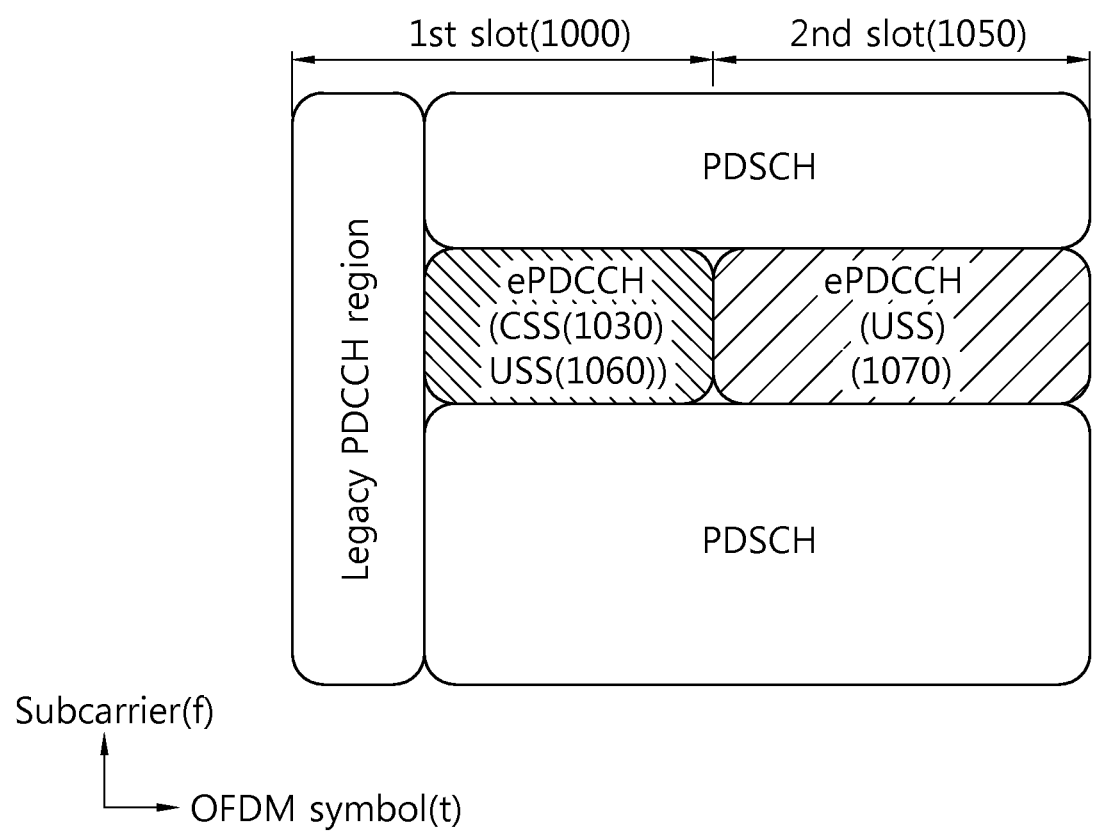
FIG. 10 is a conceptual view illustrating a method of transmitting control information through e-PDCCH according to an embodiment of the present invention.

FIG. 10 is a conceptual view illustrating a method of transmitting control information through e-PDCCH according to an embodiment of the present invention.

Referring to FIG. 10, it is the same as in FIG. 8 to transmit the common search space 1030 at the first slot 1000, but the region except for the common search space 1030 may be defined as the UE-specific search space 1060. That is, the terminal may receive partial terminal specific information through e-PDCCH transmitted at the first slot 1000.

The terminal common control information and the terminal specific control information both may be transmitted through the common search space 1030 and the UE-specific search space 1060 at the first slot 1000, and only the terminal specific control information may be transmitted through the UE-specific search space 1070 at the second slot 1050. By using this method, in case the amount of terminal common control information transmitted to the terminal at the first slot 1000 is small, additional terminal specific control information may be transmitted, thereby preventing waste of resources.

As a reference signal to demodulate control information transmitted through the above-described common search space and UE-specific search space, DM (demodulation)-RS (or UE-specific reference signal) defined in the existing 3GPP LTE/LTE-A system may be used. Hereinafter, according to an embodiment of the present invention, a method of transmitting a reference signal used for demodulating the control information transmitted through the common search space and UE-specific search space is described.

Figure 11:
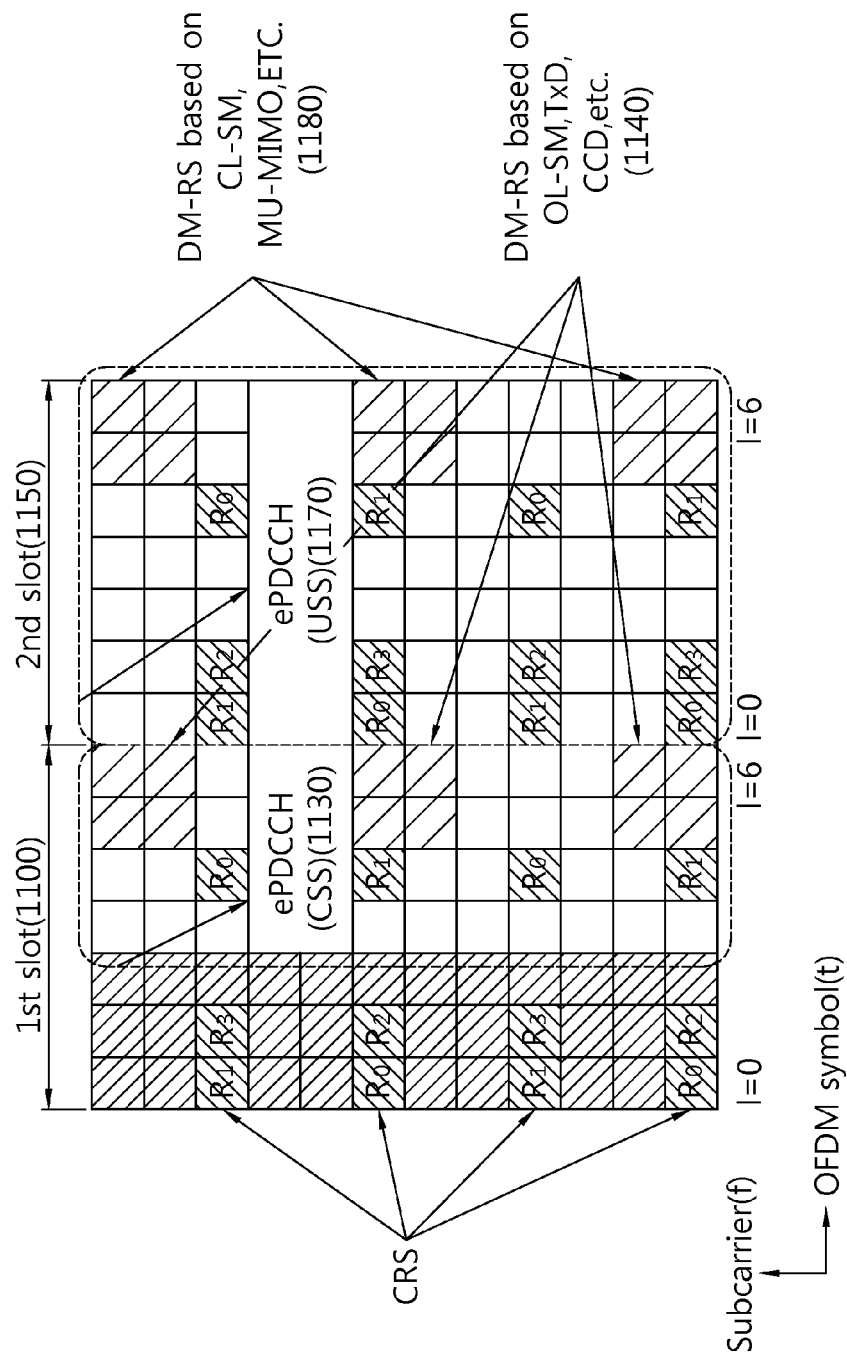
FIG. 11 is a conceptual view illustrating a reference signal for demodulating e-PDCCH information according to an embodiment of the present invention.

FIG. 11 is a conceptual view illustrating a reference signal for demodulating e-PDCCH information according to an embodiment of the present invention.

Referring to FIG. 11, assume that DM-RS (or UE-specific RS, 1140, 1180) is transmitted to demodulate e-PDCCH through the first slot 1100 and the second slot 1150 of the subframe. According to an embodiment of the present invention, a method of transmitting the DM-RS may change depending on whether the DM-RS is used to demodulate the control information transmitted through the common search space 1130 or is used to demodulate the control information transmitted through the UE-specific search space 1170.

Methods to transmit a specific signal may be classified into an open-loop method and a closed-loop method depending on whether specific information (for example, channel information) is fed back.

For example, the open-loop method is easy to implement and is free of channel information feedback procedure because the transmit end requires no or little channel information. On the contrary, the closed-loop method exhibits good performance when channel information is correct because it utilizes channel information fed back from the receive end, but feedback of correct channel information may cause an increase in amount of channel information, so that the amount of information fed back is in a trade-off relationship with system performance.

According to an embodiment of the present invention, DM-RS 1140 transmitted to demodulate control information such as system information transmitted from the common search space 1130 may be transmitted using an open-loop transmission method. The open-loop transmission method refers to a method in which no or little feedback information is received from the receive end to the transmit end and then transmission is done. For example, open loop-based MIMO, CDD (cyclic delay diversity), SFBC (space frequency block coding) or random beamforming (or opportunistic beamforming), which adopts spatial diversity or spatial multiplexing, may be used as the open loop transmission method. According to an embodiment of the present invention, when transmitting the DM-RS 1140 to demodulate the resource region corresponding to the common search space 1130, a reference signal may be transmitted based on such open loop transmission methods. The DM-RS 1140 transmitted based on the open loop transmission method may be used to demodulate the cell specific control information or terminal common control information which is transmitted through the common search space 1130.

In contrast, the DM-RS 1180 transmitted to demodulate the UE-specific search space 1170 may be transmitted based on a closed loop transmission method. The closed loop transmission method refers to a method of transmitting data to the receive end based on information fed back from the receive end.

Closed loop transmission method can transmit data packet having a higher SNR value than open loop transmission method. By using closed loop transmission, terminal can stably transmit data and transmit data packet having higher data rate. Transmitting data packet having higher data rate means transmitting packet having higher MCS value or transmiting packet using higher transmission rank (the number of simultaneous transmission layer). Accordingly, if base stations use closed loop transmission to transmit RS in UE-specific search space, the terminal can receive UE-specific control information based on the RS modulated using higher MCS and transmitted using higher transmission rank than cell specific information.

As examples of the closed loop transmission method, there are CSI feedback-based closed loop MIMO scheme and MU (multi user) MIMO, and based on such closed loop transmission scheme, the DM-RS 1180 may be transmitted.

The DM-RS 1180 transmitted based on the closed loop transmission method may be used to demodulate the UE-specific control information transmitted through the UE-specific search space 1170.

That is, since the DM-RS 1140 transmitted to demodulate the control signal transmitted from the common search space 1130 is a common reference signal to demodulate the control signal transmitted to all the terminals or aggregation of a plurality of terminals in the cell, the DM-RS 1140 is transmitted using an open loop transmission method without separately using feedback information. In contrast, the DM-RS 1180 transmitted to demodulate the UE-specific search space 1170 is information to demodulate control information transmitted to a specific terminal through the UE-specific search space 1170, and accordingly, may be transmitted through a closed loop transmission method.

Figure 12:
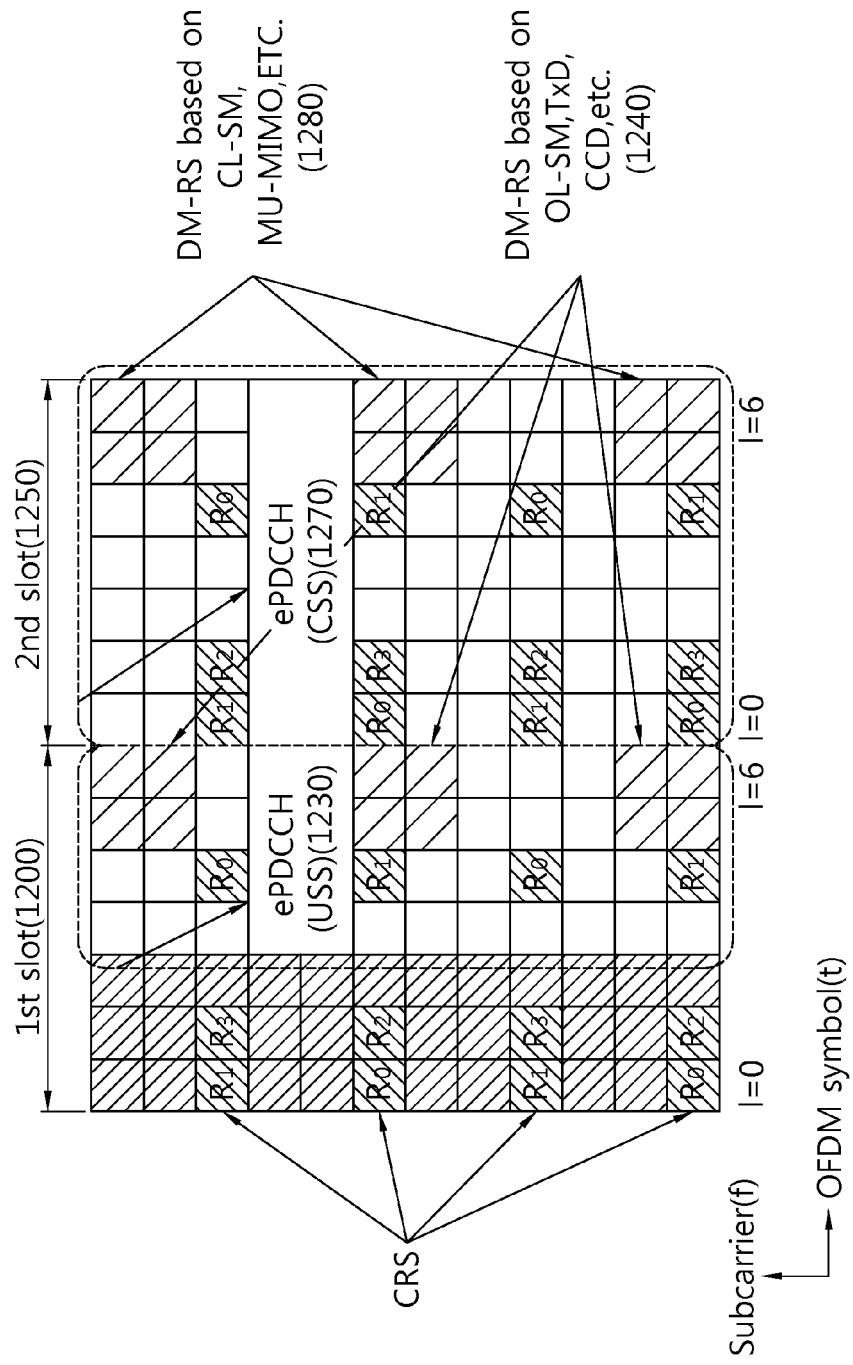
FIG. 12 is a conceptual view illustrating a reference signal for demodulating e-PDCCH information according to an embodiment of the present invention.

FIG. 12 is a conceptual view illustrating a reference signal for demodulating e-PDCCH information according to an embodiment of the present invention.

In FIG. 12, assume that control information through the common search space 1270 is transmitted at the second slot 1250 and control information through the UE-specific search space 1230 is transmitted at the first slot 1200. In such case, opposite to the case shown in FIG. 10, the DM-RS 1240 to demodulate control information transmitted through the UE-specific search space 1230 at the first slot 1200 of the subframe may be transmitted by the closed loop transmission method. Further, the DM-RS 1280 to demodulate the control information transmitted through the common search space 1270 at the second slot 1250 of the subframe may be transmitted using the open loop transmission method.

Figure 13:
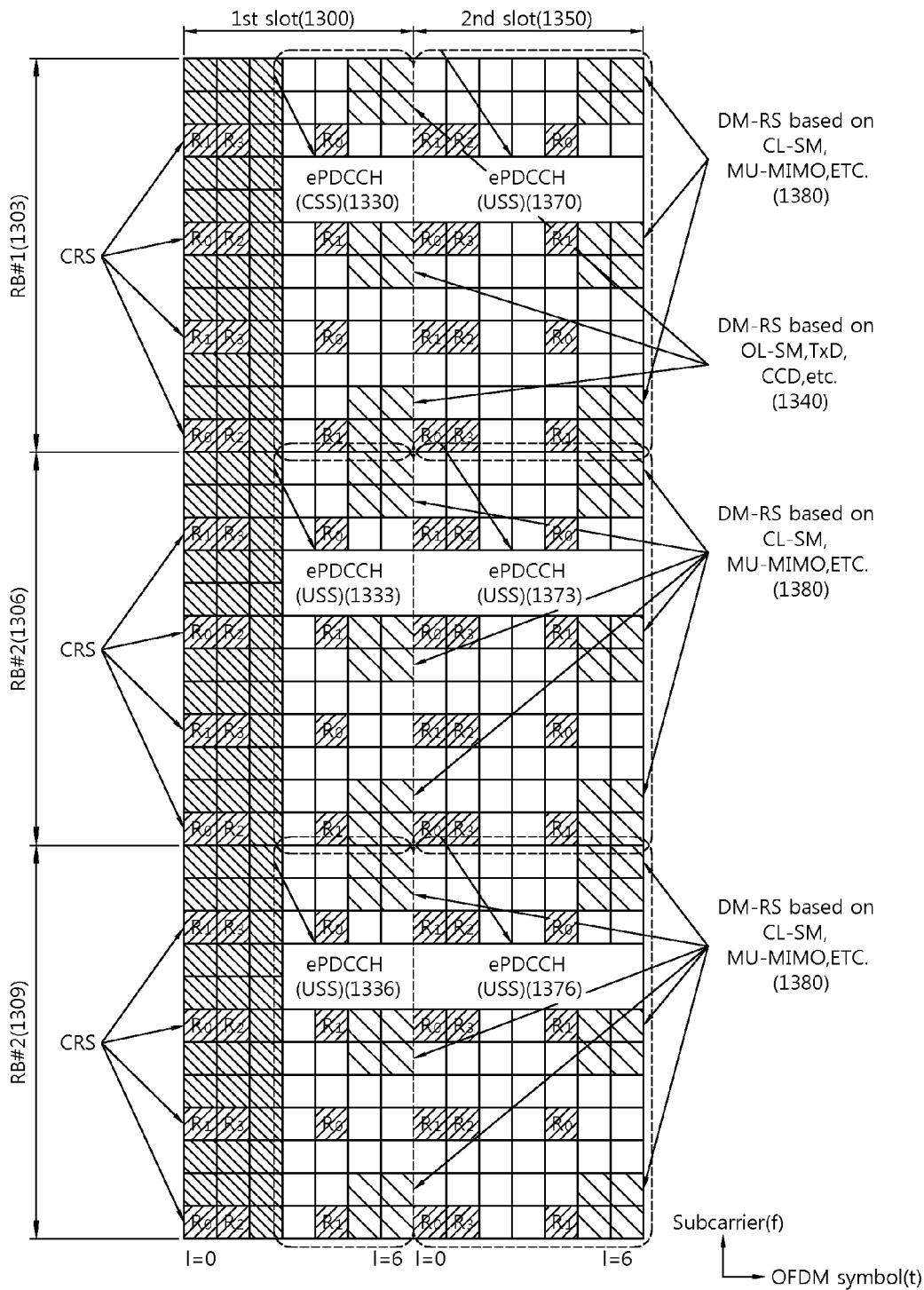
FIG. 13 is a conceptual view illustrating a reference signal to demodulate e-PDCCH information according to an embodiment of the present invention.

FIG. 13 is a conceptual view illustrating a reference signal to demodulate e-PDCCH information according to an embodiment of the present invention.

The method of transmitting a reference signal as shown in FIG. 13 is directed toward the case where at the first slot 1300 the terminal common control information and the terminal specific control information are both transmitted through the common search space 1330 and the UE-specific search space 1335, and at the second slot 1350 only the terminal specific control information is transmitted through the UE-specific search space 1370.

Referring to FIG. 13, at the first slot 1300 where the terminal common control information and the terminal specific control information are both transmitted through the common search space 1330 and the UE-specific search space 1350, the DM-RS 1340 may be transmitted by selectively using the open loop transmission method or the closed loop transmission method based on the characteristic of search space which the RB included.

For example, we can suppose that the common search space is in the first resource block 1303, the UE-specific search space is in the second resource block 1306, the UE-specific search space is in the first resource block 1309. In this case, DM-RS to demodulate the control information transmitted in common search space via e-PDCCH can transmitted using open loop transmission method. On the other hand, DM-RS to demodulate the control information transmitted in UE-specific search space via e-PDCCH can transmitted using closed loop transmission method.

In the second slot 1350, UE-specific control information can be transmitted via the UE-specific search space (1370, 1373, 1376). The control information transmitted in the UE-specific search space (1370, 1373, 1376) of the second slot 1350 can be demodulated using closed loop transmission method.

According to an embodiment of the present invention, information on a resource block assigned for the common search space or UE-specific search space may be implicitly or explicitly transmitted from the base station to the terminal.

Figure 14:
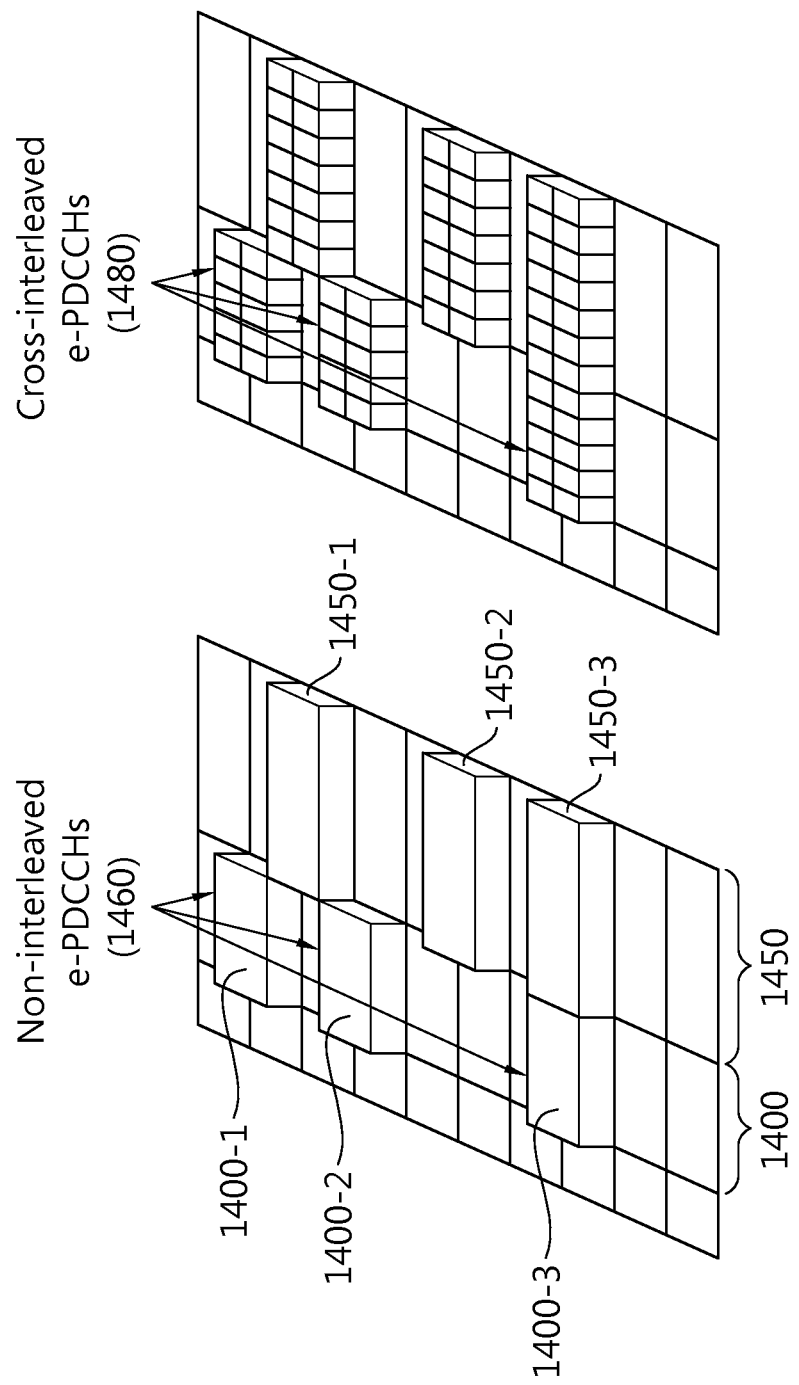
FIG. 14 is a conceptual view illustrating a method of a base station indicating to a terminal information on a resource block assigned for a search space according to an embodiment of the present invention.

FIG. 14 is a conceptual view illustrating a method of a base station indicating to a terminal information on a resource block assigned for a search space according to an embodiment of the present invention.

Assume that the common search space is present in the first slot 1400 and the UE-specific search space is present in the second slot.

Referring to FIG. 14, information on resource blocks 1400-1, 1400-2, and 1400-3 that form a search space at the first slot 1400 and information on resource blocks 1450-1, 1450-2, and 1450-3 that form a search space at the second slot 1450 are transmitted to the terminal through RRC signaling at the upper layer or may be implicitly transmitted to the terminal as CSI-RS configuration information.

Further, depending on whether e-PDCCH transmitted at the same slot is subjected to interleaving, e-PDCCH may be separated into non-interleaved e-PDCCH 1460 and cross interleaved e-PDCCH 1480. Information associated with interleaving the e-PDCCH (for example, information whether the cross interleaving is applied to which RB of the slot) region in terms of slot or RB (resource block) to which cross interleaving applies) is also transmitted from the base station to the terminal through RRC signaling or may be implicitly transmitted to the terminal through CSI-RS configuration information.

Meaning of informing the CSI-RS configuration information to the terminal is disclosed below. The CSI-RSs transmitted by at least one neighboring node in multi node system use different resource in order to alleviate the interference between the CSI-RSs. The resource of the CSI-RSs transmitted by neighboring node can be configured per each terminal in network. Accordingly, when a terminal is moving from the coverage of a node A to the coverage of a node B, the terminal's CSI-RS configuration A can be changed to CSI-RS configuration B by a certain operation of network. Accordingly, mapping relation between a node and e-PDCCH can be regulated when the e-PDCCH resources used by a certain terminal is predefined. In short, e-PDCCH resource allocation information (RB information) can be mapped based on the CSI-RS configuration information. A terminal can be informed the e-PDCCH resource allocation information implicitly based on the configured CSI-RS information.

Figure 15:
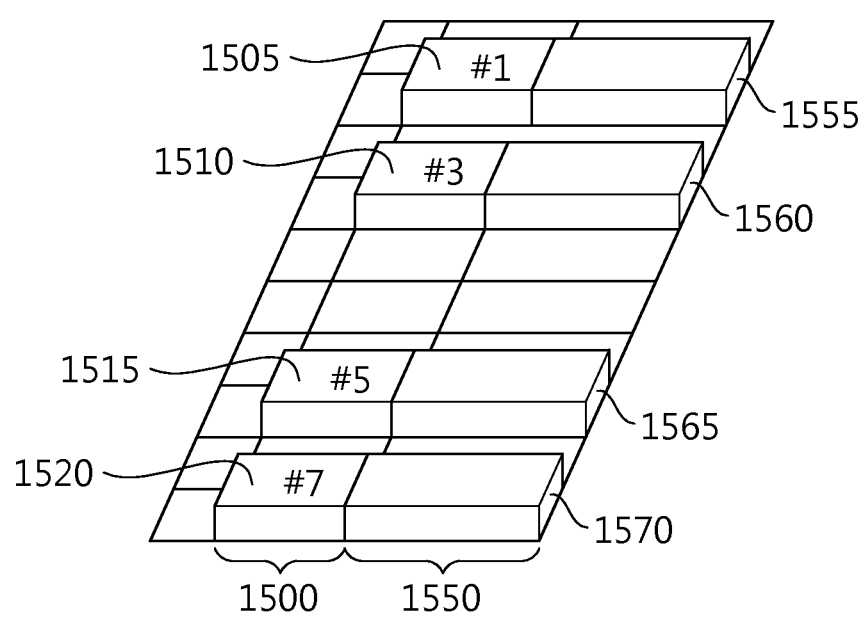
FIG. 15 is a conceptual view illustrating a method of indicating, to a terminal, information on a resource block assigned for a search space according to an embodiment of the present invention.

FIG. 15 is a conceptual view illustrating a method of indicating, to a terminal, information on a resource block assigned for a search space according to an embodiment of the present invention.

Referring to FIG. 15, resource blocks 1505, 1510, 1515, and 1520 that form a search space at the first slot 1500 and resource blocks 1555, 1560, 156, and 1570 that form a search space at the second slot 1550 may have the same pattern.

In case the resource blocks to form the search spaces, respectively, at the first and second slots 1500 and 1550 have the same pattern, the duplicate information on the resource blocks assigned for the search space may be not repeatedly transmitted from the base station to the terminal.

For example, the terminal may receive only information on what PRB (physical resource block) is assigned to the search space of the first slot 1500, and based on such information, the terminal may obtain information on the search space of the second slot 1550.

For example, it may be assumed that PRBs (physical resource blocks) assigned to the common search space at the first slot 1500 may be aware of information, such as #1(1505), #3(1510), #5(1515) and #7(1520). The terminal may be aware that UE-specific search spaces 1550, 1560, 1565, and 1570 are present at the same pattern position of the second slot 1550.

A method of receiving information on the resource block of the second slot 1550 based on the resource block information of the search space of the first slot 1500 may apply to a case where, according to another embodiment of the present invention, USS (UE-specific search space) is present at the first slot of the PRBs assigned to the search space and CSS (common search space) is present at the second slot of the PRB or a case where CSS and USS are present at the first slot of the PRBs assigned to the search space and USS is present at the second slot of the PRB.

Figure 16:
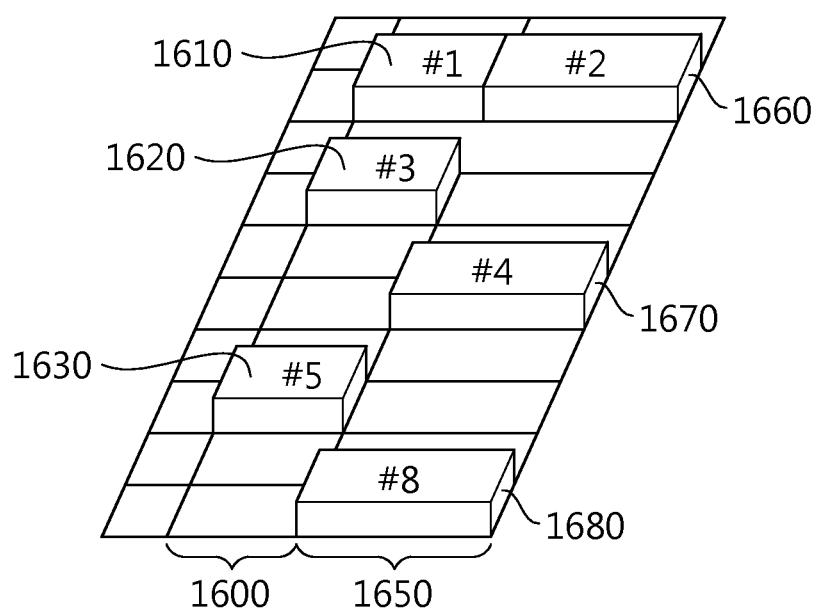
FIG. 16 is a conceptual view illustrating a method of indicating, to a terminal, information on a resource block assigned for a search space according to an embodiment of the present invention.

FIG. 16 is a conceptual view illustrating a method of indicating, to a terminal, information on a resource block assigned for a search space according to an embodiment of the present invention.

Referring to FIG. 16, information on resource blocks 1610, 1620, and 1630 that form a search space at the first slot 1600 and information on resource blocks 1660, 1670, and 1680 that form a search space at the second slot 1650 may be transmitted to the terminal by different methods.

For example, in case common terminal control information is transmitted through the common search space at the first slot 1600 and terminal specific control information is transmitted through the UE-specific search space at the second slot 1650, information on the resource blocks 1610, 1620, and 1630 that form the common search spaces 1610, 1620, and 1630 of the first slot may be implicitly transmitted by CSI-RS configuration, and information on the resource blocks 1660, 1670, and 1680 that form the UE-specific search space of the second slot 1650 may be explicitly transmitted by RRC signaling.

For example, in case PRBs#1(1610), PRBs#3(1620), and PRBs#5(1630) are assigned to the common search space, assignment information of PRBs#1(1610), PRBs#3(1620), and PRBs#5(1630) may be transmitted as CSI-RS configuration information, and in case the remaining PRBs#2 (1660), PRBs#4(1670), and PRBs#8(1680) are assigned to the UE-specific search space, assignment information of PRBs#2(1660), PRBs#4(1670), and PRBs#8(1680) may be transmitted by RRC signaling.

As described above, control information transmitted at the first slot 1600 may be different from control information transmitted at the second slot 1650, and the method of transmitting information on the resource block forming the search space at the first and second slots 1600 and 1650 may vary.

Figure 17:
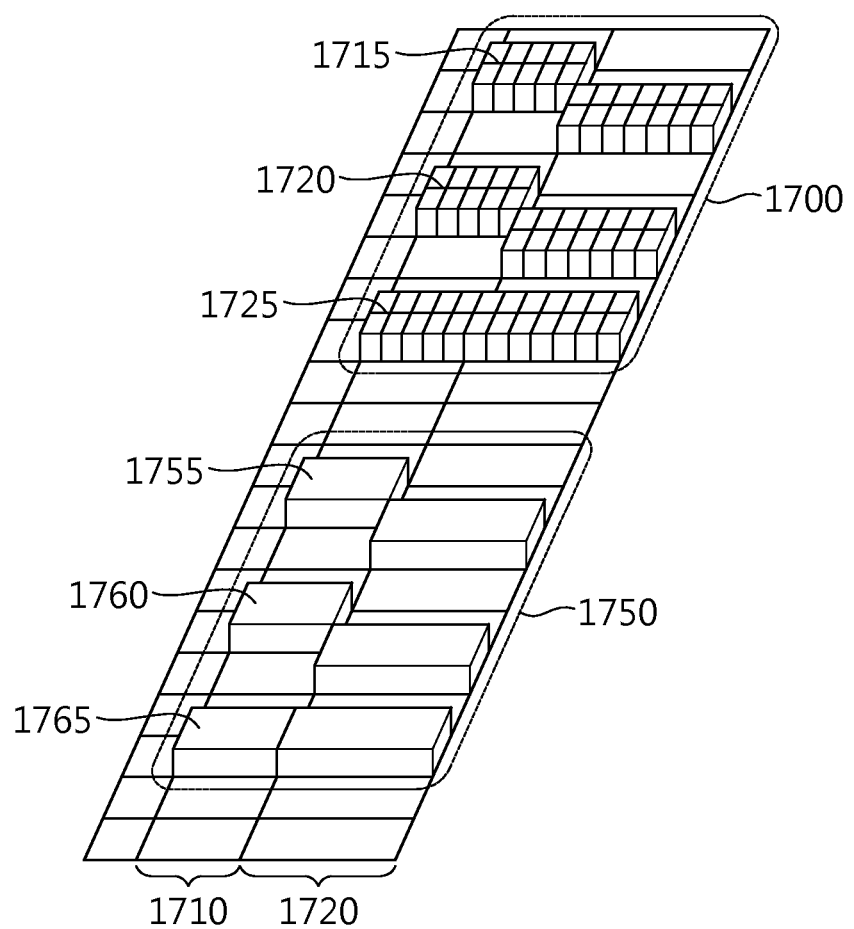
FIG. 17 is a conceptual view illustrating a method of indicating, to a terminal, information on a resource block assigned for a search space according to an embodiment of the present invention.

FIG. 17 is a conceptual view illustrating a method of indicating, to a terminal, information on a resource block assigned for a search space according to an embodiment of the present invention.

In FIG. 17, different transmission methods may be used depending on whether e-PDCCH is transmitted by cross interleaving or by non-cross interleaving, so that the assignment information of the resource block may be indicated by the search space.

In case the search space of e-PDCCH is part 1700 that has undergone cross interleaving, information on the resource block that forms the search space using the CSI-RS configuration may be known to the terminal. In contrast, in case the search space of e-PDCCH is part that has not performed the cross interleaving 1750, information on the resource block that forms the search space using RRC signaling may be known to the terminal.

For example, in case, looking at only the first slot 1710, PRBs#1(1715), PRBs#3(1720) and PRBs#5(1725) constituting the search space are RPBs that have conducted cross interleaving, information on the search space may be implicitly transmitted by using CSI-RS configuration. Information on PRBs#2(1755), PRBs#4(1760) and PRBs#8(1765), which didn't get through cross interleaving, may be transmitted by RRC signaling.

Figure 18:
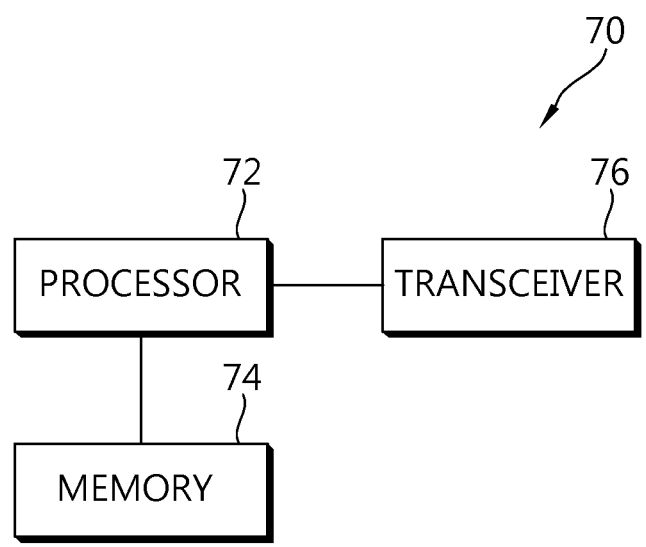
FIG. 18 is a block diagram illustrating a wireless apparatus according to an embodiment of the present invention.

FIG. 18 is a block diagram illustrating a wireless apparatus according to an embodiment of the present invention.

The wireless apparatus 70 includes a processor 72, a memory 74, and a transceiver 76. The transceiver 76 transmits/receives a radio signal and has an IEEE 802.11 physical layer installed therein. The processor 72 is functionally connected to the transceiver 76 to implement the IEEE 802.11 MAC layer and physical layer. According to an embodiment of the present invention, the processor 72 may monitor the common search space at the first slot of the subframe to obtain the first control information over the first e-PDCCH and may monitor the UE (user equipment)-specific search space at the second slot of the subframe to obtain the second control information over the second e-PDCCH. Further, the processor 72 may be configured to implement the above-described embodiments of the present invention.

The processor 72 and/or the transceiver 76 may include ASIC (application-specific integrated circuits), other chipsets, logic circuits, and/or data processing devices. The memory 74 may include a ROM (read-only memory), a RAM (random access memory), a flash memory, a memory card, a storage medium, and/or other storage devices. When implemented in software, the above-described schemes may be embodied in modules (procedures or functions) that perform the above-described functions. The modules may be stored in the memory 74 and may be executed by the processor 72. The memory 74 may be positioned in or outside the processor 72, and may be connected to the processor 72 by well-known various means.

The invention claimed is:

1. A method of monitoring downlink control information, the method comprising:
monitoring a common search space at a first slot of a subframe to obtain first control information over a first enhanced physical downlink control channel (e-PDCCH);
monitoring a user equipment (UE)-specific search space at a second slot of the subframe to obtain second control information over a second e-PDCCH;
transmitting first type information indicating whether a resource block assigned to the common search space is included in the first slot of the subframe and second type information indicating whether a resource block assigned to the UE-specific search space is included in the second slot of the subframe,
wherein the first type information is implicitly transmitted through a channel state information (CSI)-reference signal (RS) configuration information element,
wherein the second type information is explicitly transmitted through a radio resource control (RRC) signaling; and
transmitting third type information indicating whether a resource block is included in a region where a cross interleaving is performed and fourth type information indicating whether a resource block is included in a region where a cross interleaving is not performed,
wherein the third type information is implicitly transmitted through a channel state information (CSI)-reference signal (RS) configuration information element,
wherein the fourth type information is explicitly transmitted through a radio resource control (RRC) signaling,
wherein the first control information is cell-specific control information and is demodulated by a first demodulation (DM)-reference signal (RS) transmitted in a common search space where the first e-PDCCH is transmitted,
wherein the second control information is UE-specific control information and is demodulated by the second DM-RS transmitted in the UE-specific search space where the second e-PDCCH is transmitted,
wherein the first DM-RS is transmitted in the common search space using an open loop transmission method, and the second DM-RS is transmitted in the UE-specific search space using a closed loop transmission method, and
wherein an allocation pattern of a resource block of the first e-PDCCH in the common search space is the same as an allocation pattern of a resource block of the second e-PDCCH in the UE-specific search space.

2. The method of claim 1, further comprising:
monitoring the UE-specific search space at the first slot of the subframe to obtain the second control information over the second e-PDCCH.

3. A wireless device configured to monitor a downlink control channel and comprising:
a radio frequency (RF) unit configured to transmit or receive a radio signal; and
a processor configured to:
monitor a common search space at a first slot of a subframe to obtain first control information over a first enhanced physical downlink control channel (e-PDCCH);
monitor a user equipment (UE)-specific search space at a second slot of the subframe to obtain second control information over a second e-PDCCH;
transmit first type information on whether a resource block assigned to the common search space is included in the first slot of the subframe and second type information on whether a resource block assigned to the UE-specific search space is included in the second slot of the subframe,
wherein the first type information is implicitly transmitted through a channel state information (CSI)-reference signal (RS) configuration information element,
wherein the second type information is explicitly transmitted through a radio resource control (RRC) signaling; and
transmitting third type information indicating whether a resource block is included in a region where a cross interleaving is performed and fourth type information indicating whether a resource block is included in a region where a cross interleaving is not performed,
wherein the third type information is implicitly transmitted through a channel state information (CSI)-reference signal (RS) configuration information element, wherein the fourth type information is explicitly transmitted through a radio resource control (RRC) signaling, wherein the first control information is cell-specific control information and is demodulated by a first demodulation (DM) reference signal (RS) transmitted in a common search space where the first e-PDCCH is transmitted, wherein the second control information is UE-specific control information and is demodulated by the second DM-RS transmitted in the UE-specific search space where the second e-PDCCH is transmitted, wherein the first DM-RS is transmitted in the common search space using an open loop transmission method, and the second DM-RS is transmitted in the UE-specific search space using a closed loop transmission method, and wherein an allocation pattern of a resource block of the first e-PDCCH in the common search space is the same as an allocation pattern of a resource block of the second e-PDCCH in the UE-specific search space.

4. The wireless device of claim 3, the processor further configured to monitor the UE-specific search space at the first slot of the subframe to obtain the second control information over the second e-PDCCH.

\* \* \* \* \*